Patented Mar. 24, 1931

1,797,612

UNITED STATES PATENT OFFICE

HANS JORDAN, OF BERLIN-STEGLITZ, GERMANY, ASSIGNOR TO THE FIRM: SCHERING-KAHLBAUM AKTIENGESELLSCHAFT, OF BERLIN, GERMANY

METHOD OF PRODUCING MENTHOL

No Drawing. Application filed August 15, 1927, Serial No. 213,202, and in Germany August 16, 1926.

My invention refers to the production of menthol and its isomers and homologues from the products of condensation of m- or p-cresol and ketones described in my copending application for patent in the United States filed June 20, 1927, Serial No. 200,289, which have the formula

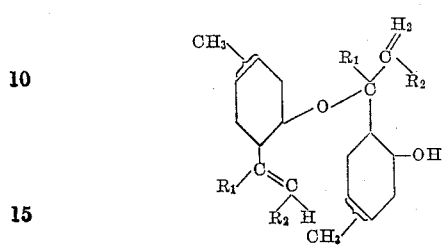

wherein $R_1$ and $R_2$ may be a hydrogen atom or an alkyl radicle or $R_1$ and $R_2$ together with the two adjacent carbon atoms may form a cyclic system. In another application filed June 20, 1927, Serial No, 200,290 I have disclosed the decomposition of these condensation products into alkyl isopropylene phenols by heating to about 300° C. In a third application filed June 20, 1927 jointly with Walter Schoeller, Serial No. 200,298, the obtention of menthol and its isomers and homologues by treating these products of decomposition with hydrogen in the presence of a catalyst, until 8 hydrogen atoms have entered into combination, is disclosed.

I have now found that I can produce menthol and its isomers and homologues direct from the condensation products mentioned above, without thermic decomposition thereof, by treating them at elevated temperature with hydrogen in the presence of one of the well known catalysts, until 16 hydrogen atoms have been introduced.

I have found it preferable to add, besides the ordinary catalyst spoken of, another catalyst capable of reducing the temperature, at which thermic decomposition occurs, thus allowing operating at the most favorable hydrogenation temperature. I have found such catalysts to be for instance the metal phenolates, for instance aluminum or magnesium phenolate, or metal compounds capable of forming phenolates, such as the oxides and other compounds of aluminum, magnesium and mercury.

In practising my invention I may for instance treat the condensation product of an alkyl phenol, such as m-cresol, and a ketone, such as acetone, in the presence of about 0.1 per cent of the aluminum compound of the unsaturated phenol to be produced and about 1 per cent of a nickel catalyst in an autoclave at 180–190° C. with hydrogen, until sixteen atoms hydrogen have been combined. I have found that the products of decomposition formed at the reaction temperature under the influence of the aluminum catalyst are hydrogenated with extreme readiness. From the reaction product menthol and its isomers and homologues can be separated out in a well known manner by fractional distillation.

Example 1

The product of condensation of m-cresol and acetone is treated in the presence of 0.1 per cent aluminum-3-methyl-6-isopropylene phenolate and 1 per cent of a nickel catalyst with hydrogen, under pressure is desired, until 16 atoms hydrogen have entered into combination. The product of the reaction is a mixture of menthol and its stereoisomers as illustrated by the equation:

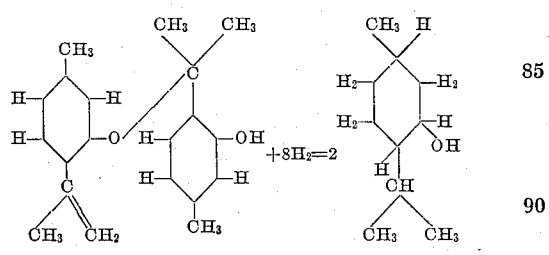

Example 2

The condensation product of p-cresol and acetone is treated at 180–190° C. with hydrogen in the presence of 0.1 per cent aluminum-4-methyl-6-isopropylene phenolate and 1 per cent of a nickel catalyst, until 16 hydrogen atoms have been combined. There results a mixture of 4-methyl-6-isopropyl cyclohexanone and its stereoisomers as shown by the equation:

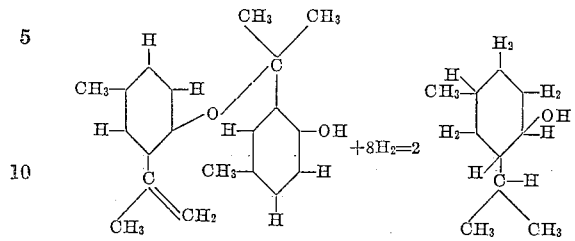

Various changes may be made in the details disclosed in the foregoing specification without departing from the invention or sacrificing the advantages thereof.

I claim:—

1. The process of producing menthol and its isomers and homologues comprising treating an ether-like product of condensation of a cresol belonging to the group constituted by m- and p-cresol with a ketone, having the formula

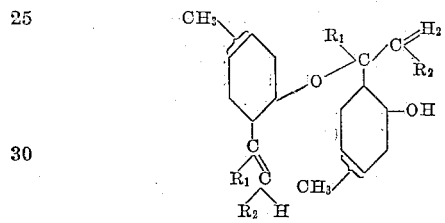

wherein $R_1$ and $R_2$ may be a hydrogen atom or an alkyl radical or $R_1$ and $R_2$ together with the two adjacent carbon atoms may form a cyclic system, at 150–230° C. in the presence of a hydrogenation catalyst with hydrogen until 16 hydrogen atoms have entered into combination.

2. The process of producing menthol and its isomers comprising treating an ether-like product of condensation of a cresol belonging to the group constituted by m- and p-cresol with acetone, having the formula

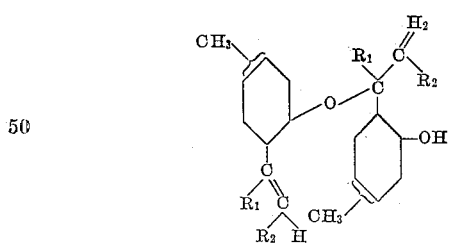

wherein $R_1$ and $R_2$ may be a hydrogen atom or an alkyl radical or $R_1$ and $R_2$ together with the two adjacent carbon atoms may form a cyclic system, at 150–230° C. in the presence of a hydrogenation catalyst with hydrogen until 16 hydrogen atoms have entered into combination.

3. The process of producing menthol and its isomers and homologues comprising treating an ether-like product of condensation of a cresol belonging to the group constituted by m- and p-cresol with a ketone, having the formula

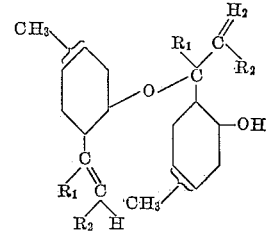

wherein $R_1$ and $R_2$ may be a hydrogen atom or an alkyl radical or $R_1$ and $R_2$ together with the two adjacent carbon atoms may form a cyclic system, at 150–230° C. in the presence of a hydrogenation catalyst and a metal phenolate with hydrogen until 16 hydrogen atoms have entered into combination.

4. The process of producing menthol and its isomers and homologues comprising treating an ether-like product of condensation of a cresol belonging to the group constituted by m- and p-cresol with a ketone, having the formula

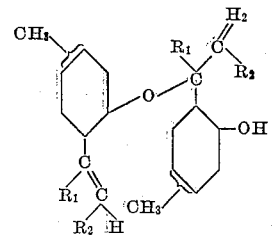

wherein $R_1$ and $R_2$ may be a hydrogen atom or an alkyl radical or $R_1$ and $R_2$ together with the two adjacent carbon atoms may form a cyclic system, at 150–230° C. in the presence of a hydrogenation catalyst and a metal phenolate of the unsaturated phenol having the formula

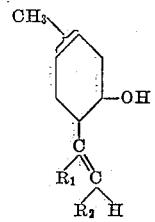

with hydrogen until 16 hydrogen atoms have entered into combination.

5. The process of producing menthol and its isomers comprising treating the ether-like condensation product of m-cresol and acetone having the formula

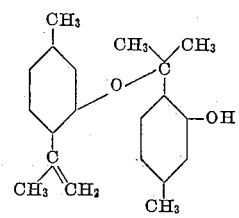

at about 180° C. in the presence of about 0.1% aluminum-3-methyl-6-isopropylene phenolate and about 1% of a nickel-catalyst with hydrogen, until 16 hydrogen atoms have entered into combination, and separating out menthol.

In testimony whereof I affix my signature.

HANS JORDAN.